United States Patent
Asquith et al.

(10) Patent No.: US 9,260,885 B2
(45) Date of Patent: Feb. 16, 2016

(54) THEFT DETERRENT LOCK

(71) Applicants: Brian Asquith, Cleveland, OH (US);
Evan Perry, Chagrin Falls, OH (US);
John Thomas, Cleveland, OH (US)

(72) Inventors: Brian Asquith, Cleveland, OH (US);
Evan Perry, Chagrin Falls, OH (US);
John Thomas, Cleveland, OH (US)

( * ) Notice: Subject to any disclaimer, the term of this patent is extended or adjusted under 35 U.S.C. 154(b) by 0 days.

(21) Appl. No.: 14/057,750

(22) Filed: Oct. 18, 2013

(65) Prior Publication Data

US 2014/0109631 A1    Apr. 24, 2014

Related U.S. Application Data

(60) Provisional application No. 61/715,937, filed on Oct. 19, 2012.

(51) Int. Cl.

| E05B 45/06 | (2006.01) |
|---|---|
| E05B 45/00 | (2006.01) |
| G08B 13/22 | (2006.01) |
| E05B 39/00 | (2006.01) |
| E05B 71/00 | (2006.01) |
| B62H 5/20 | (2006.01) |
| G08B 13/06 | (2006.01) |

(52) U.S. Cl.
CPC .............. *E05B 45/005* (2013.01); *B62H 5/20* (2013.01); *E05B 39/005* (2013.01); *E05B 71/00* (2013.01); *G08B 13/22* (2013.01); *G08B 13/06* (2013.01); *Y10T 70/402* (2015.04)

(58) Field of Classification Search
CPC ............................. E05B 45/005; G08B 13/22
USPC ........... 340/542, 635, 427, 426.1, 432; 70/15, 70/39, 233
See application file for complete search history.

(56) References Cited

U.S. PATENT DOCUMENTS

| 5,408,212 | A | * | 4/1995 | Meyers et al. | 340/427 |
|---|---|---|---|---|---|
| 5,534,847 | A | * | 7/1996 | McGregor | 340/432 |
| 6,373,382 | B2 | * | 4/2002 | Tikkanen et al. | 340/432 |
| 2011/0298601 | A1 | * | 12/2011 | Foor | 340/427 |

* cited by examiner

*Primary Examiner* — Toan N Pham
(74) *Attorney, Agent, or Firm* — Brian Asquith

(57) ABSTRACT

The various technologies presented herein relate to detection of a lock is being tampered with, cut, removed, etc. An electrical circuit can be incorporated into a lock portion and a securing portion (e.g., a bar, a cable, etc.) of the lock. The electrical circuit can include a conductive element located along the length of the bar, cable, etc., with an electrical charge applied to the conductive element. Upon damage to the conductive element, e.g., during an attempt to cut or remove the lock, a change in the electrical charge from an initial state can be determined, which can further generate an alarm. The alarm can be a light, speaker, etc. An alarm notification can be transmitted from the lock to a remote device, e.g., a mobile phone, a central monitoring system, etc. A trembler switch can be incorporated into the lock to detect movement of the lock.

20 Claims, 10 Drawing Sheets

THEFT DETERRENT LOCK

RELATED APPLICATION

This application claims priority to U.S. Provisional Patent Application No. 61/715,937, filed on Oct. 19, 2012, entitled "THEFT DETERRENT LOCK", the entirety of which is incorporated herein by reference.

BACKGROUND

While bicycle riding increases in popularity across the globe there has also been an according rise in bicycle theft. A number of systems are available to prevent such theft from locking up a bicycle (e.g., with a lock, chain, cable, and the like), to individual marking of bikes with unique serial numbers.

SUMMARY

The following is a brief summary of subject matter that is described in greater detail herein. This summary is not intended to be limiting as to the scope of the claims.

Various exemplary embodiments presented herein relate to detecting a lock being tampered with. In an exemplary embodiment, a lock system is presented, wherein the lock system comprises a detachable securing component, wherein a conductive component can be formed along the length of the securing component, and a lock. In an embodiment, a first end of the securing component can locate into a first opening in the lock and a second end of the securing component can locate in a second opening in the lock. In a further embodiment, the lock can further comprise a charge sensing component, wherein the charge sensing component can be configured to form an electrical circuit with the conductive component, and sense a change in an electrical charge applied across the electrical circuit.

Another exemplary embodiment comprises a method for determination of a lock being tampered with. The method can comprise detecting a change in electrical charge across an electrical circuit, wherein the electrical circuit comprises a conductive element located on a securing component and a lock. The method further comprises generating an alarm based at least in part upon detecting the change in the electrical charge.

A further exemplary embodiment for determination of a bicycle lock being tampered with comprises a computer-readable medium comprising instructions that, when executed by a processor, cause the processor to perform acts comprising detecting a change in electrical charge across an electrical circuit, wherein the electrical circuit comprises a conductive element located on a securing component and a lock. In an embodiment, the securing component and the lock form a bicycle lock. In a further embodiment, the change in electrical charge can result from the conductive element being cut or damaged. In another embodiment, an alarm can be generated based at least in part upon detecting the change in the electrical charge.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1A is a cross-section through A-A of a U-bar illustrating an exemplary embodiment.

FIG. 1B is a cross-section through A-A of a U-bar illustrating an exemplary embodiment.

FIG. 1C is a cross-section through A-A of a U-bar illustrating an exemplary embodiment.

FIG. 1D is a cross-section through A-A of a cable-lock illustrating an exemplary embodiment.

FIG. 1E is a schematic of a length of conductor comprising thinned regions, according to an exemplary embodiment.

DETAILED DESCRIPTION

Figure 1:
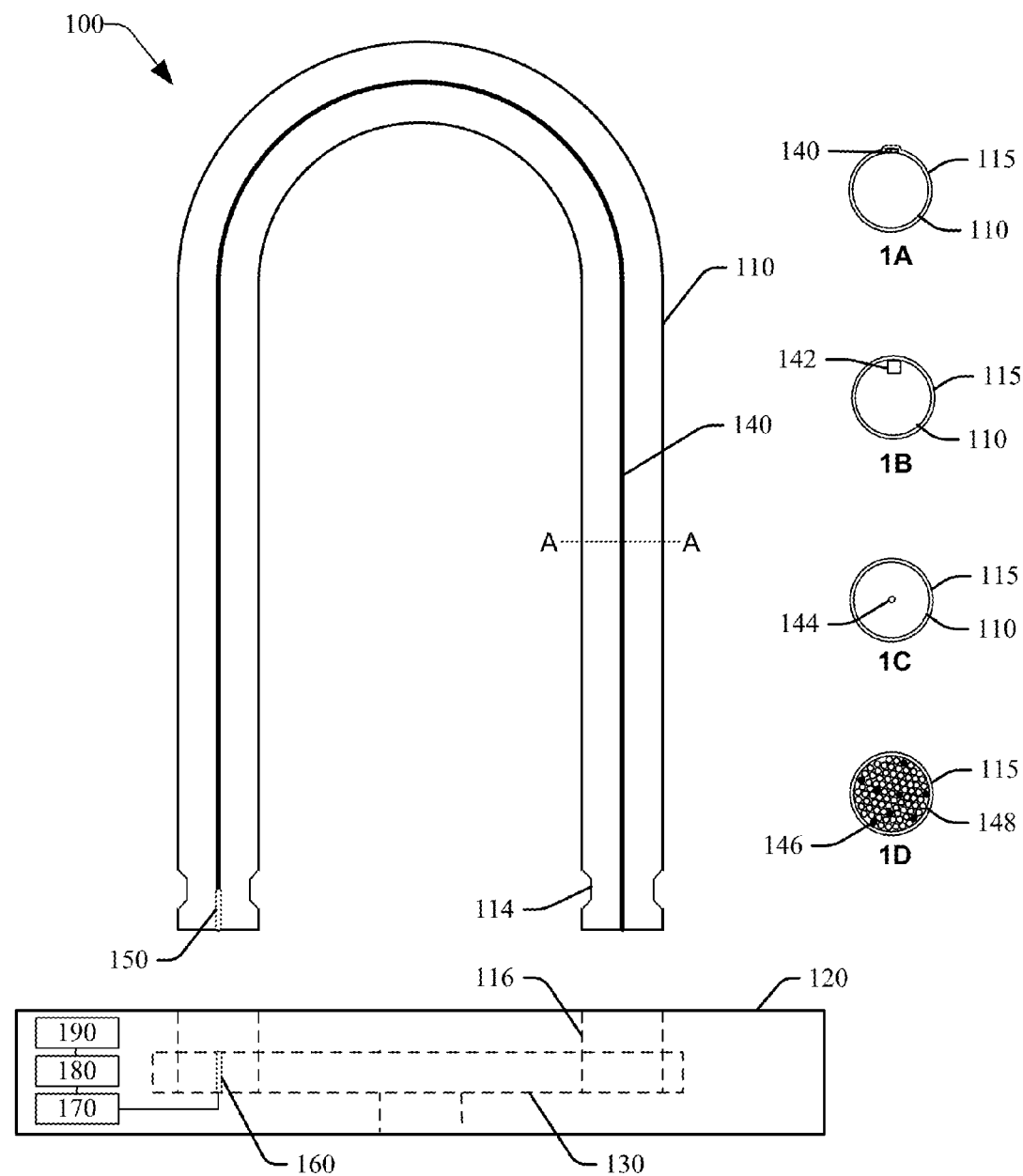
FIG. 1 is a block diagram of a lock illustrating an exemplary embodiment for determination of tampering of the lock.
Figure 1:
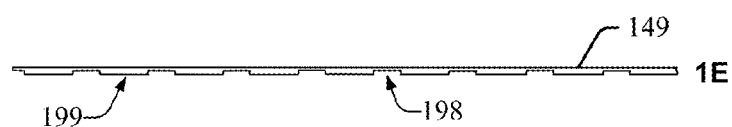

Various technologies pertaining to determination of a theft or a tampering event is occurring are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to detecting a lock is being tampered with, e.g., during an attempt to steal an item secured with the lock. An electrical circuit can be formed between a lock portion (e.g., contains a locking mechanism) of the lock, and a securing bar (e.g., for a U-lock or a D-lock configuration), a cable (e.g., for a cable lock configuration), or a chain (e.g., for a lock and chain configuration). The electrical circuit can include a conductive element located along the length of the bar, cable, or chain, and a charge can be applied to the conductive element. If the conductive element is damaged, cut, etc., during an attempt to cut or remove any of the cable, chain, or bar, the change in electrical charge from an initial state (e.g., conductive element is intact) can be determined. Based upon the change in electrical charge an alarm can be generated. In an embodiment, the alarm can comprise of activation of a light, speaker, or other alarm component located on the lock. In another embodiment, a notification of an alarm event can be transmitted from the lock to a remote device, e.g., a mobile phone, indicating the lock is being tampered with. Alternatively, the notification can be transmitted to a central monitoring system, whereby the central monitoring system can be operated by an individual, company, etc., that is monitoring anti-theft devices in a region (e.g., operating citywide, statewide, nationwide, etc.). A trembler switch can be incorporated into the lock to detect movement of the lock. In another embodiment, a location component can be incorporated into a bicycle to facilitate determination of movement of the bicycle from a particular location.

FIG. 1 illustrates a system 100 which can include a U-lock style locking mechanism for securing a device, component, structure, etc., where such structure in an exemplary embodiment is a bicycle. A U-bar 110 (also referred to herein as a securing component or securing device) is utilized in conjunction with a lock portion 120, wherein the U-bar 110 is detachable from the lock portion 120. A recessed portion 114 of U-bar 110 can engage in opening 116 in lock 120 and can be secured therein by a locking component 130. Hence, a first end of U-bar 110 can locate into a first opening in the lock portion 120 and a second end of U-bar 110 can locate into a second opening in the lock portion 120. In the exemplary, non-limiting embodiment, a system for detecting a change in electrical charge (e.g., voltage, current, etc.) is presented, with a strip 140 of conductive material running the length of the U-bar 110. In typical use, (as shown in 1A, 1B, and 1C discussed further below) the U-bar is covered in a protective material, and with the exemplary embodiment, a portion 150 of strip 140 is exposed to facilitate electrical coupling with a power supply 180, a charge sensing component 170 and an alarm component 190. When U-bar 110 is engaged with lock 120 (i.e., is in a locked state) the exposed portion 150 is electrically coupled to contact 160 in lock 120, which in conjunction with electrical energy from power supply 180, an electrical circuit is formed comprising strip 140 and power supply 180. The charge sensing component 170 can be utilized to measure the electrical charge in the electrical circuit. In a situation where the electrical circuit is complete an initial voltage V1, for example, is measured by charge sensing component 170. In an embodiment, power supply 180 can be a battery, a solar cell, and the like.

One approach employed by bike thieves to break a U-lock style locking system (e.g., U-bar 110 and lock 120) is to cut through U-bar 110 (e.g., with an angle grinder, a hacksaw, and the like). In another approach, the lock 120 is separated (e.g., wrenched free) from U-bar 110. However, by utilizing a U-lock style system incorporating an electrical circuit, in response to the first approach of breakage of the U-bar it is anticipated that strip 140 will be cut as part of the cutting operation of U-bar 110. In response to the second approach for breakage, U-bar 110 can become separated from lock 120. In both cases the electrical circuit comprising strip 140 and power supply 180 is altered, either as a result of strip 140 being cut, or strip 140 being removed from contact 160. The alteration (e.g., a voltage drop from V1 to a voltage V2) in the electrical charge across the electrical circuit can be detected by the charge sensing component 170. In a first embodiment, as illustrated in FIG. 1, an alarm component 190 associated with charge sensing component 170 can be activated in response to charge sensing component 170 detecting a change in the electrical circuit (e.g., a voltage change from V1 to V2). Alarm component 190 can be of any suitable type/component, e.g., an audible alarm, a visual alarm, or other alarm device, which can alert anyone in the vicinity of the bicycle (and U-lock system 100) that the U-lock is being tampered with, e.g., cut or wrenched apart.

FIGS. 1A, 1B and 1C are cross-sections through U-bar 110 (e.g., through A-A) illustrating a plurality of ways in which strip 140 can be incorporated into the U-lock system. FIG. 1A illustrates U-bar 110 with strip 140 located thereon and covered with a protective layer 115, where the protective layer can comprise any suitable material such as paint, a polymer coating, ceramic coating, etc. It is to be appreciated that while in FIG. 1 strip 140 is depicted as simply running along the one edge of U-bar 110, other approaches are equally applicable, such as having strip 140 wrapped spirally along the length of U-bar 110, can form a meandered line structure along the length of U-bar 110, for example. FIG. 1B illustrates a U-bar 110 having a recessed portion which is filled with conductive material 142 to form the conductive pathway along the length of the U-bar 110. FIG. 1C illustrates a conductive pathway 144 being incorporated within U-bar 110. It is to be appreciated that material forming U-bar 110 may also be a conductor (e.g., the material is ferrous), and while not shown, strip 140, material 142, and pathway 144 can be formed (e.g., coated) with an insulator which can act as an electrical barrier, and thereby electrically isolates the conductive element (e.g., strip 140, material 142, and/or pathway 144) from the conductive U-bar 110.

While the lock system 100 is illustrated with a U-bar 110, other locking systems to which the various embodiments presented herein are also considered to be within the domain of this application, for example, where the U-bar 110 is replaced with a cable-lock system (e.g., a cable forms the securing component), or a chain-lock system (e.g., a chain forms the securing component). Accordingly, with reference to FIGS. 1A, 1B and 1C, the conductive pathway 146 of FIG. 1D (e.g., strip/material 140, 142, or 144) can be one or more of a plurality wires forming a cable 148. Further, another embodiment, rather than utilizing a strip 140 as the conductive pathway, the whole of U-bar 110 can comprise the conductive pathway across which the change in electrical charge is determined. Further, in another embodiment, a plurality of strips 140 (or other conductive pathways) can be incorporated on or into the U-bar 110 to facilitate increased determination of when an attempt is being made to cut through U-bar 110.

For example, there is an increased chance of a conductive pathway being cut when a plurality of conductive pathways exist compared with a single pathway. In another embodiment, rather than a strip 140 being utilized, it is possible to shroud U-bar 110 in a layer of material which can act as the conductive pathway. For example, coating 115 can be a conductive paint. In another embodiment, where a chain forms the securing component 110, a conductor can be threaded through the length of the chain, and cutting of the conductor can cause an alarm to be generated.

As shown in FIG. 1E, the thickness of a conductive element 149 (e.g., any of conductor 140, 142, 144 or 146) can be varied along its length to facilitate breakage. In an aspect, the thinned portions 198 can encourage breakage of the conductive element 149 between the thick portions 199, as opposed to a situation where a conductive element has a constant thickness (e.g., there are no thinned portions). Hence, with a varied conductive element 149 the indication that the lock is being tampered with may be initiated earlier. For example, the securing component may only be partially cut but stress applied to the securing element during the cutting (e.g., cutting of a cable) may be sufficient to cause fracture of the conductive element 149 (e.g., at a thinned portion 198) and hence initiate an indication that the lock is being tampered with, even though the lock has not been fully destroyed (e.g., the securing component is not yet cut all the way through or is only partially removed from the lock portion 120).

In an aspect the operation of the various embodiments presented herein enable a variety of materials to be suitable for forming the securing component (e.g., U-bar 110, cable 148, a chain, etc.). For example, the U-bar 110 no longer has to be formed from steel as the functionality of the U-bar 110 as a securing component (e.g., providing cutting resistance) may be considered secondary to the operation of detecting a change in electrical charge across a conductive pathway (e.g., any of components 140, 142, 144 or 146). Accordingly, the functionality of the U-bar 110 can be considered to be a locating component (e.g., acts to attach a bicycle to a bicycle rack) and also provide a housing or support for the conductive pathway. Hence, rather than utilizing materials that have a high cutting resistance, e.g., steel, iron, titanium, etc., other materials such as a polymer, a reinforced polymer (e.g., glass fiber reinforced polymer), a ceramic, a metal having a lower resistance to cutting than steel (e.g., aluminum), etc., can be utilized to form the U-bar 110, a housing of lock 120, etc., which can add a benefit of weight saving to the locking system 100.

Figure 2:
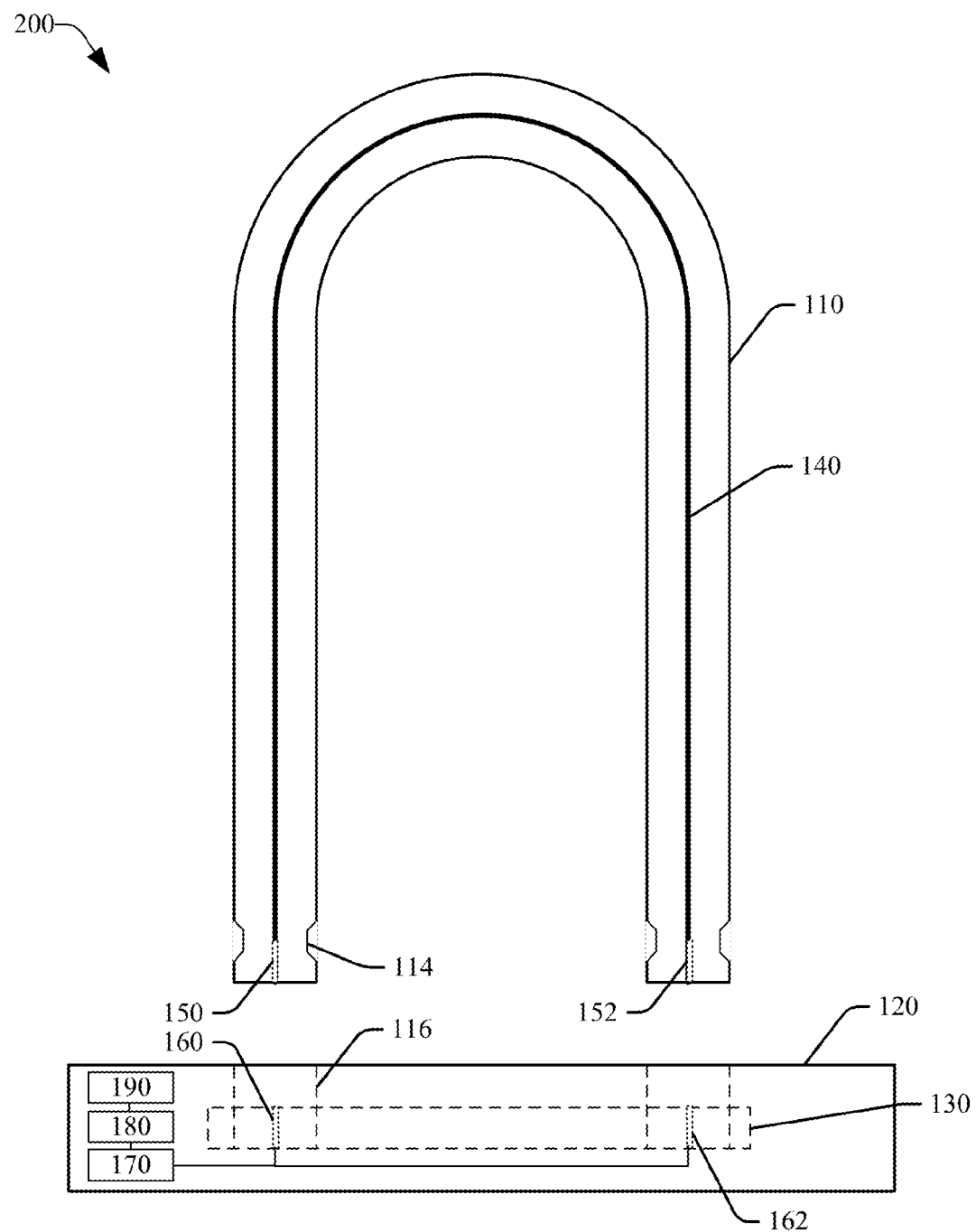
FIG. 2 is a block diagram of a lock illustrating an exemplary embodiment for determination of tampering of the lock.

FIG. 2, system 200, illustrates a U-bar 110 and lock 120 system where the electrical circuit is formed via contact 160, exposed portion 150, strip 140, exposed portion 152, contact 162, power supply 180, and charge sensing component 170. Hence, in comparison with FIG. 1, a circuit is formed by respective components 150, 152, 140, 160 and 162.

Figure 3:
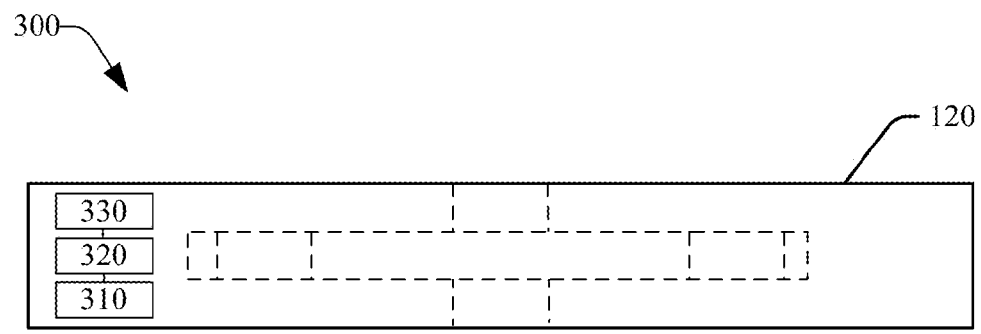
FIG. 3 is a block diagram illustrating a lock with an incorporated trembler mechanism, according to an exemplary embodiment.
Figure 4:
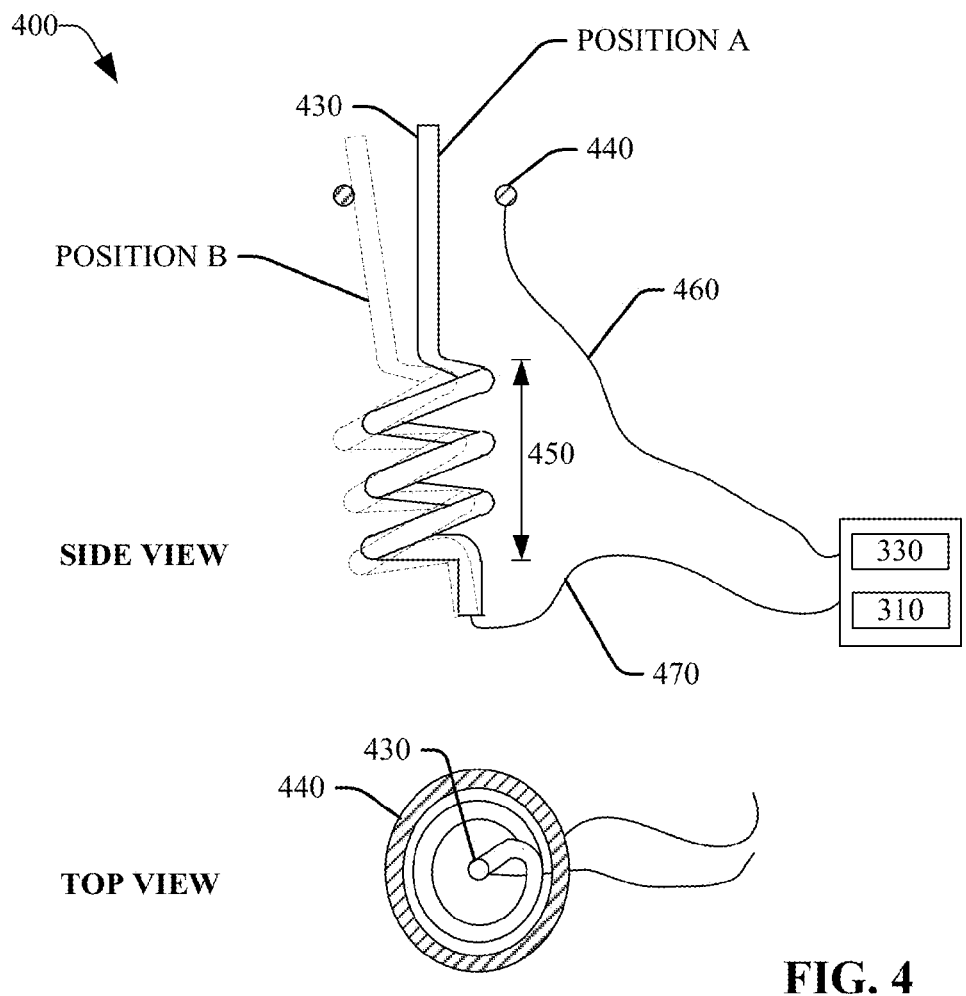
FIG. 4 is a block diagram illustrating a lock with an incorporated trembler switch, according to an exemplary embodiment.

FIG. 3, system 300, illustrates an exemplary, non-limiting embodiment which comprises a trembler mechanism incorporated into the lock portion 120. Typically, if a lock is to be cut or wrenched it will require movement of the lock. By incorporating a trembler system into the lock portion 120 such movement can be detected. The exemplary, non-limiting embodiment illustrated in FIG. 3 comprises a power supply 310 (if required), a tremble detection component 320 and a trembler switch 330. In an embodiment, trembler switch 330 can comprise of a mercury tilt switch, or similar device. In another embodiment trembler switch can comprise of a spring-based switch as illustrated in FIG. 4. Given the mobile nature of bike locks a device which finds a position of rest can be useful. By utilizing the tremble switch illustrated in FIG. 4 while the switch is at a position of rest (e.g., a bicycle is locked with a locking system) the leaf spring 430 will be in a position of rest (e.g., position A) in accordance with the switch comprising a spring portion. Hence, the leaf spring 430 is not in electrical contact with ring contact 440.

However, if the lock is moved (e.g., to facilitate breaking the lock to steal the bicycle) the leaf spring 430 will also move (e.g., to position B) which places leaf spring 430 in contact with a ring contact 440, which can act to close the electrical circuit including power supply 310, connecting wires 460/470, and tremble detection component 320. Upon detection of the trembler switch 330 being activated, an alert component associated with tremble detection component 320 can be activated, for example, an alarm component (e.g., alarm component 190). It is to be appreciated that while the tremble system (e.g., trembler switch 330, a tremble switch comprising a leaf spring 430 and ring contact 440, and the like) is illustrated as comprising a portion of a U-lock system (e.g., incorporated into lock 120) the tremble system can also be utilized in a device which can be removably attached to a bicycle frame, for example the tremble switch can be incorporate into a system which can be attached by any suitable fixing means such as a bolted bracket(s), an elastic band connector(s), magnet(s), and the like. Hence, when a bicycle is to be left somewhere for a period of time, for example, outside a store, library, office, restaurant, bus station, etc., the trembler switch system can be attached to the bicycle and activated for the duration that the bicycle is left unattended. In another example, the trembler switch system can be incorporated into the bicycle or a component attached thereto (e.g., a water bottle, pump, etc.) and when the bicycle is left unattended the trembler switch system can be activated.

Figure 5:
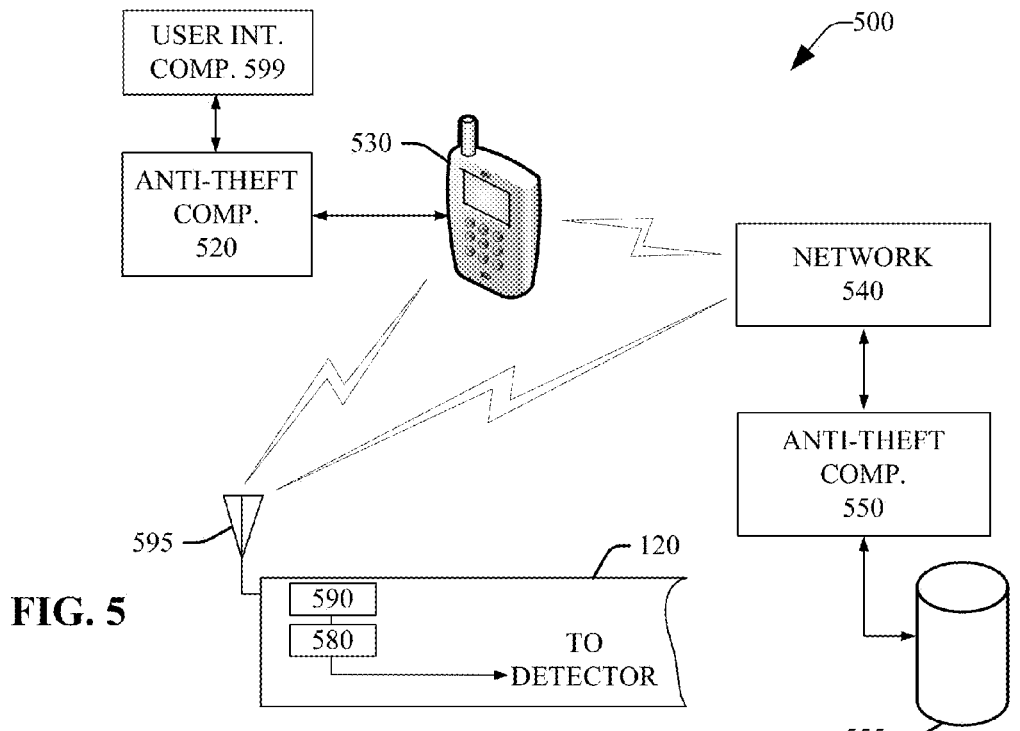
FIG. 5 is a block diagram illustrating a lock system in communication with remote systems, according to an exemplary embodiment.

As previously mentioned, an alarm component (e.g., alarm component 190) can be activated by a sensing component (e.g., charge sensing component 170, tremble detection component 320, etc.). The alarm system can be expanded upon by providing communication with a communication device (e.g., a cellphone, a tablet pc, a portable pc, a computer, a wearable computer, etc.) along with an external system which can provide monitoring and anti-theft services. As illustrated in FIG. 5, system 500, a sensing component 580 is associated with a transmission component 590 which is in communication, via antenna 595, with a mobile device 530 and/or a telecommunication network 540. Mobile device 530 can have an anti-theft component 520 operating thereon. Hence, when a sensing component 580 determines that the lock or portable trembler system (hereinafter the lock and portable trembler system are referred to as security system) may be undergoing tampering, the sensing component 580 can initiate communication with mobile device 530 and anti-theft component 520. For example, if the security system is being cut (e.g., strip 140 is being cut as part of cutting U-bar 110) an indication of such activity can be transmitted to the mobile device 530 that the security system is being tampered with. Hence, for example, where the bicycle is locked outside of a library, the owner of the bicycle can immediately, upon notification of the tampering, go out to the location of the bicycle and confront whoever is tampering with the bike, lock, trembler system, security system, etc. A user interface component 599 can be incorporated into the anti-theft component 520 to facilitate interaction with one or more components included in system 500. For example, the user interface component 599 can be utilized to activate the security system, such that while the lock is being secured any signal from the trembler switch 330 and/or a charge sensing component 170, can be ignored until the lock is secured and in a state of rest. Also, as further described herein, the user interface component 599 can be utilized to configure operational distance(s) between the lock and the mobile device, and the like. The user interface component 599 can facilitate any interaction/configuration by an operator required to facilitate operation and monitoring by a security system.

Figure 6:
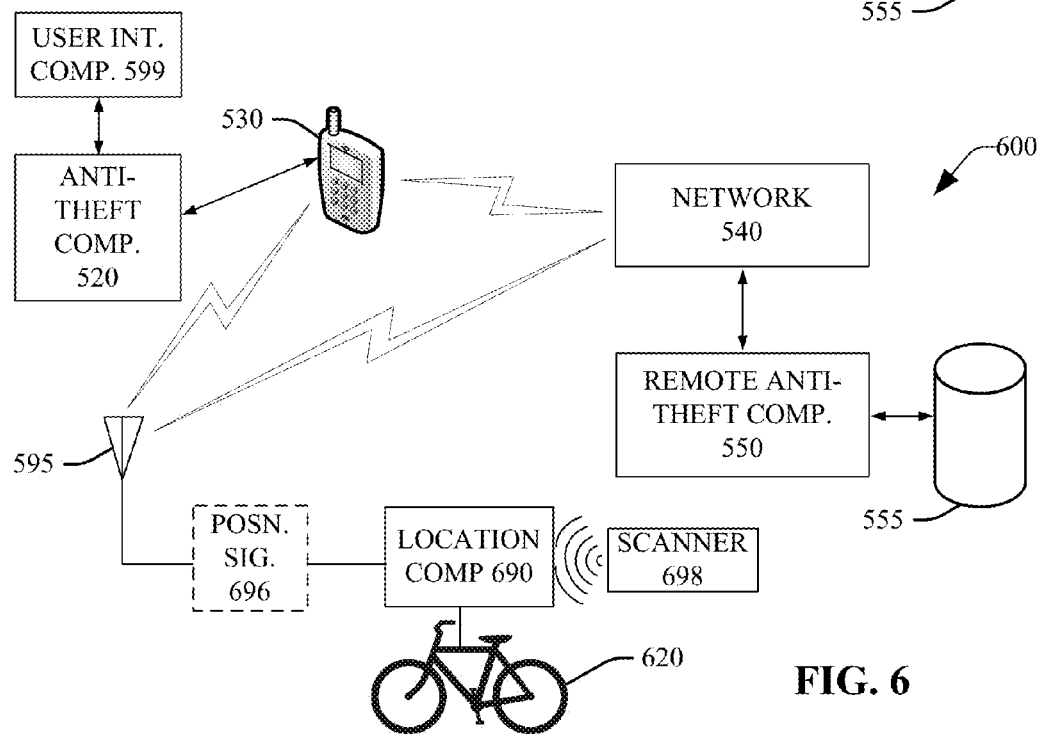
FIG. 6 is a block diagram illustrating a bicycle-based system in communication with remote systems, according to an exemplary embodiment.

In another exemplary embodiment, as illustrated in FIG. 6, system 600, a location component can be incorporated into a bicycle 620, lock 100, or other component associated with the bicycle (e.g., water bottle, pump, etc.), according to an embodiment. A location component 690 can transmit a position signal 696, e.g., a signal based on a global positioning system (GPS), and the like. Location can also be determined by technologies associated with cellular telephone systems, such as one or more location measuring units (LMUs) being utilized to determine position of a location component 690, (e.g., by triangulation, etc.). The position signal 696 can be received at mobile device 530. The anti-theft component 520 can be configured such that if the bicycle 620 is moved beyond a defined distance, an alert can be sent to the anti-theft component 520 indicating that the bicycle 620 is being, or, has been, moved. For example, a cyclist locks a bicycle 620 up to a bicycle rack outside of a restaurant, and hence given the size of the restaurant, the cyclist knows that they will not be at a distance at any given time of greater than 30 feet from the bicycle. The distance operation can be performed by the cyclist making a distance-to-bicycle measurement via a GPS system associated with the mobile device 530. Via the user interface component 599 and the anti-theft component 520, the cyclist can set an alert distance to 35 feet. Hence, if the bicycle 620 is moved to a position greater than 35 feet, it can be assumed that the bicycle is being stolen, an alert can be generated by the anti-theft component 520 enabling the cyclist to confront the thief. In another embodiment, anti-theft component 520 can perform a determination of the distance between the bicycle 620 and the location of the cyclist (e.g., the position of mobile device 530) which can be presented to the cyclist via the user interface component 599. For example, the cyclist can enter a building and walk to the furthest distance in the building that they wish to access (e.g., a bathroom, a particular table, a particular seat, etc.), and based thereon, can confirm the determined distance between the cyclist (e.g., position of the mobile device 530) and the bicycle 620 presented on the user interface component 599, for example, by selecting the distance presented on the user interface component 599. In another embodiment, the anti-theft component 520 can be configured (e.g., via user interface component 599) to present a distance range based upon the determined distance such that rather than presenting the exact determined distance, a degree of tolerance can be included. For example, the anti-theft component 520 can make a determination (e.g., via a GPS system located on the mobile device 530) that the mobile device 530 (and accordingly the cyclist) is about 80 feet away from the bicycle 620. However, a distance adjustment/tolerance can be applied (e.g., ±5 feet), and hence the distance presented on the user interface component 599 is 75-85 feet which can be selected. It is to be appreciated that the distances presented are exemplary, and any distance, distance range, etc., are applicable to the embodiments presented herein.

The location component 690 can be configured such that the frame, or other component, of bicycle 620 acts as the antenna. In another embodiment, location component 690 can be a passive device such that when a scanning device 698 is placed near the bicycle 620, data stored in the location component 690 can be read. Such an operation can be utilized when one or more bikes are recovered and a determination is required to identify the bike, owner, location of theft, etc. Such an operation can be undertaken when a bike is deemed to be stolen and is placed up for sale by an individual, at a store, via an online auction (e.g., EBAY), an online listing service (e.g., CRAIGSLIST), etc., where the passive tag can be read to identify the bicycle. For example, a person may consider a bicycle up for sale on EBAY is their bicycle which has been stolen. A local police force, or other entity, can access the bicycle, read the passive tag and determine if the bicycle is stolen, or not. Such an operation can be useful where a haul of stolen bicycles is recovered and a passive RFID tag on each of the bicycles can be read to determine ownership(s).

As illustrated in FIGS. 5 and 6, a network 540 and remote anti-theft system 550 can also be associated with mobile device 530, lock 120, bicycle 620 and associated theft detection components. Remote anti-theft system 550 can comprise of components necessary for receiving alerts (e.g., bicycle being tampered with, lock being tampered with, bicycle is no longer in expected location, etc.), a database (e.g., in datastore 555) configured to store information for tracking bicycles, owner information, communication information (e.g., SIM card information), and any other information necessary to facilitate provision of bicycle tracking/anti-theft. Upon notification of a potential theft, the database can be accessed and information retrieved to facilitate notification of the bicycle owner of the potential theft.

Figure 7:
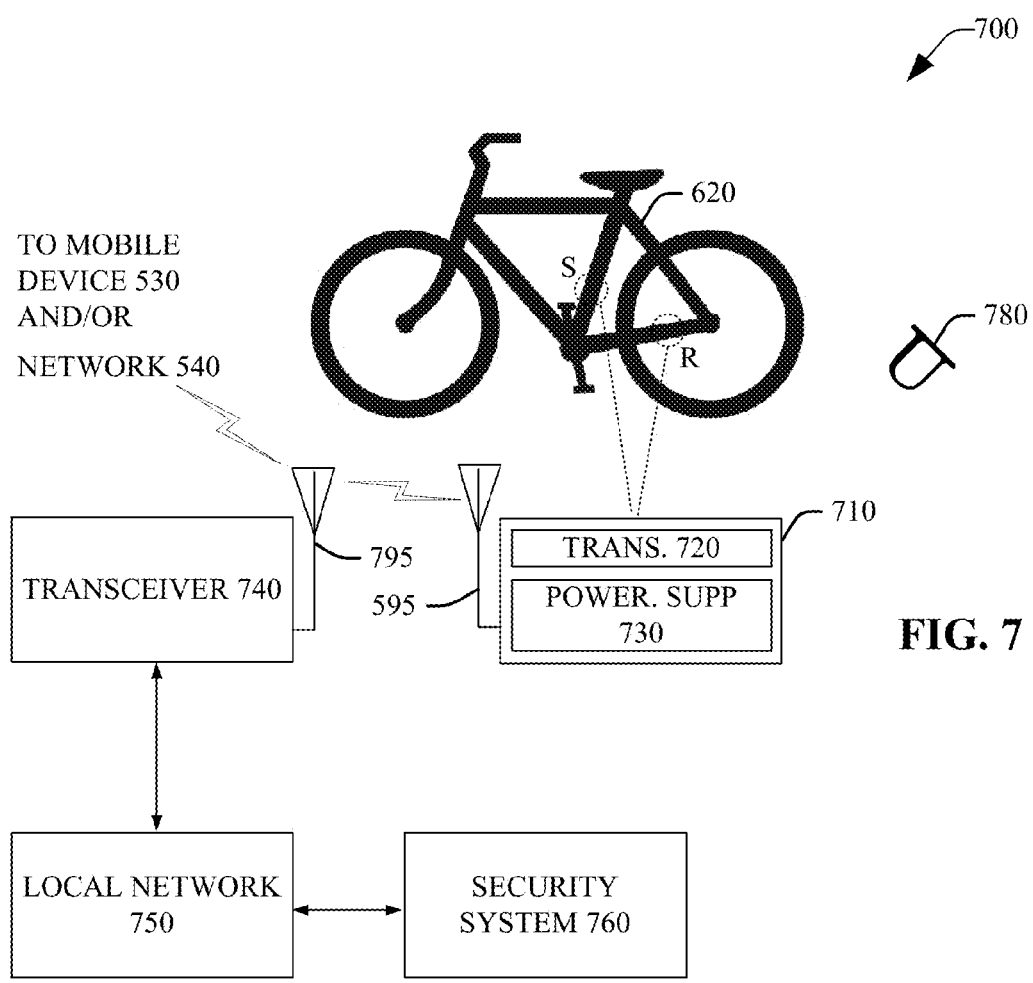
FIG. 7 is a block diagram illustrating a system comprising a transmitter system which can be incorporated into a bicycle, according to an exemplary embodiment.

FIG. 7, illustrates a system 700 comprising a transmitter system which can be incorporated into a bicycle, according to an embodiment. Depending upon the moment of incorporation, e.g., during manufacture or a post-sale/shipping operation, the transmitter can be incorporated into the manufacture of the bicycle frame or as a later operation (e.g., performed by the local bicycle shop (LBS)). As illustrated in FIG. 7, during manufacture of a bicycle frame, a transmitter system 710 can be incorporated into the frame at a position that, for subsequent removal, would probably require damage (e.g., cutting) of the bicycle frame from areas of the frame of limited access such as a seat stay, chain stay, middle of the top tube, downtube, seat tube, etc. For example, a transmitter can be incorporated into the chainstays R as part of a carbon fiber layup operation for fabrication of a carbon fiber frame, or located in place with a suitable adhesive such as an epoxy resin for any of a steel-framed bicycle, a carbon-fiber framed bicycle, an aluminum-framed bicycle, a titanium framed bicycle, etc. Alternatively, for incorporation by a LBS regions of greater access can be utilized as made accessible by removal of a seatpost, the pedals/bearings, a handlebar-stem, etc., thereby enabling a transceiver 710 to be placed in the seat tube S, the top tube, the down tube, seat stay, chain stay, handlebars, bicycle rack, etc. Transceiver 710 can include an antenna 595, where the antenna can be a foil antenna, a meandered line antenna, and the like. Alternatively the bicycle frame 620 (or an associated component, such as the handlebars) can act as the antenna.

Transceiver 710 can be configured by anti-theft component 520 on mobile device 530 and/or by anti-theft component 550 associated with network 540. For example, transceiver 710 can be configured to transmit a signal at a predefined period when the bicycle is in a particular location, such as at the bicycle owner's house. In an exemplary scenario, the owner could configure transceiver 710 to generate a signal every 0.25 hours when the bike is at a home location. Either of remote anti-theft component 550 and/or anti-theft component 520 can monitor the frequency of the predefined signal such that if a signal is not received as expected the bicycle owner can be alerted, e.g., via mobile phone 530 (e.g., by anti-theft component 520). Also an individual associated with the remote anti-theft component 550 (e.g., an entity monitoring data in datastore 555) can react to the lack of predefined signal by notifying the bicycle owner (e.g., via mobile device 530) or other entity associated with the security of the bicycle. Transceiver 710 comprises a transceiver component 720 and a power supply 730 (e.g., a battery). In an embodiment, transceiver 710 can be in communication with a secondary transceiver (e.g., transceiver 740) and when the bicycle is moved out of a predefined range of transceiver 740 an alert can be forwarded to mobile device 530 and/or network 540. In an exemplary embodiment, transceiver 740 can be a stand alone unit located within communication range of where the bicycle 620 is located, e.g., where the bicycle is stored in a basement, transceiver 740 can be a unit on the basement wall within transmission range of transceiver 710.

In another embodiment, transceiver 740 can be in communication with a local network system 750 (e.g., comprising LAN, computing components, etc.) which can be utilized to record data associated with transceiver 740 (e.g., signals, timings, etc.). Further local network system 750 can be associated with a security system 760, where security system 760 can comprise of a video camera and associated components. Upon indication that bicycle 620 is being moved, e.g., transceiver 710 is moving out of a predefined range of transceiver 740, the security system 760 can be activated and video captured of the theft. In an embodiment, transceiver 740 can be incorporated into a bicycle rack or similar apparatus which is used to store bicycle 620. When the bicycle 620 (and transceiver 710) is within a given range of the transceiver 740 (e.g., stored on the rack) a signal indicating 'bicycle stored' can be generated. In another embodiment, similar to the approach of the U-bar 110 coupling with lock 120, a switch or contact (e.g., similar to contact 160) can be engaged/disengaged upon removal/placement of bicycle 620 on a bicycle rack or similar storage device. In another embodiment, transceiver 740 can be located in a bicycle lock 780. When bicycle lock 780 is in vicinity of transceiver 710 (e.g., bicycle 620 is locked with the bicycle lock 780) a signal indicating such an arrangement can be forwarded to any of mobile device 530, network 540, local network 750. However, if bicycle lock 780 is removed from bicycle 620 (e.g., signaling between transceiver 710 and transceiver 740 is broken) and the bicycle 620 is removed from bicycle lock 780 an indicative signal can be sent to any of a mobile device 530, a network 540, a local network 750. It is to be appreciated that while transceiver 710 is described above as being located in a fixed manner on bicycle 620, transceiver 710 can be a mobile component which can be attached and detached from bicycle 620 as required to facilitate operation of the various embodiments herein. For example, transceiver 710 can be removably located on a seat rail of bicycle 620.

As mentioned previously, anti-theft component 550 can be located on a remote network, e.g., at a business location of an entity offering bicycle monitoring services. In an embodiment, bicycle manufacturers can build bicycles with the transceiver 710 system incorporated into the bicycles (e.g., incorporated into the carbon weave or located in the frame by fixative etc., for steel-framed, aluminum-framed, and/or titanium-framed bicycles). Hence, a potential buyer of a bicycle may consider having such a theft component located in their bicycle as a requirement for bicycle purchase. In another situation, a LBS can opt into a program offered by a bicycle monitoring service such that they can retro-fit transceiver 710 to a bicycle 620 (e.g., by fixing in the frame) and thus attracts customers to the LBS.

In a further embodiment, a plurality of power supplies (e.g., a plurality of power supplies 180 and/or 310) can be utilized. For example, a first power supply can be utilized to provide the electrical charge across the conductive element (e.g., any of elements 140, 142, 144, 146, 149, etc.), as well as any components that may be incorporated into a lock/sensor (e.g., any of a charge sensor 170, an alarm component 190, a tremble detection component 320, a trembler switch 330, a sensing component 580, a transmission component 590, transceiver 720, etc.). A second power supply can be utilized to provide backup power in the event that the first power supply fails, is tampered with, etc. For example, the second power supply can be a battery, a capacitor, or other power storage device, such that if the first power supply becomes unavailable (e.g., damaged or rendered inoperable as part of a tampering process), the second battery can provide sufficient power to effect raising of an alarm (e.g., by an alarm component 190, a transmission component 590, etc.).

While the above has been focused on application towards bicycles and bicycle theft, the various embodiments are not so limited in application and can be utilized in any scenario where damage, theft, etc., may be a concern. For example, a similar security approach to the various embodiments presented herein can be applied to a locking system applied to a shipping container, where tampering of a shipping container, e.g., attempted removal of a lock to gain access to the container contents, can be detected. Such an approach can be useful at a dock or port where numerous containers are stored, and attempted entry to a container can easily be detected by application of the above embodiments. A similar application can be utilized in a storage facility (e.g., a self storage facility) where a plurality of locks are used to secure possessions, etc. Similarly, in a locker room, etc. Also, the various embodiments can be applied to maintaining security of a building, such as being incorporated into a lock box system as utilized by a realtor. In another embodiment, the various aspects presented herein can be incorporated into any suitable locking system, such as a padlock, a sliding bolt lock, a combination lock, a lock for towing security, a motorcycle lock, a keyed lock, a chain lock, a steering wheel lock, a cash storage system, a door lock, a truck bed security lock, a hidden shackle padlock, a lock for cargo security, a hasplock, an electrical lockout system, etc. One or many locks can be monitored by a mobile device, a remote computer system, etc., as described herein.

Further, while the various embodiments presented herein relate to a system where a change in electrical charge is being determined, the various embodiments can be equally applied to detecting a change in another medium. For example, an optical component (e.g., a fiber optic cable and a light transmitter can be incorporated into a lock) and a break in the light path can be determined. In an embodiment, a light transmitter can be incorporated into the lock (120) and any of components 140, 142, 144, or 146 can be an optical fiber whereby sensor 170 can operate as an optical sensor detecting a change in a magnitude of light being transmitted along the optical fiber as a result of the optical fiber being cut.

FIGS. 8-12 illustrate exemplary methodologies relating to determination of unexpected and/or malicious activity occurring between components communicatively coupled across a backplane. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Figure 8:
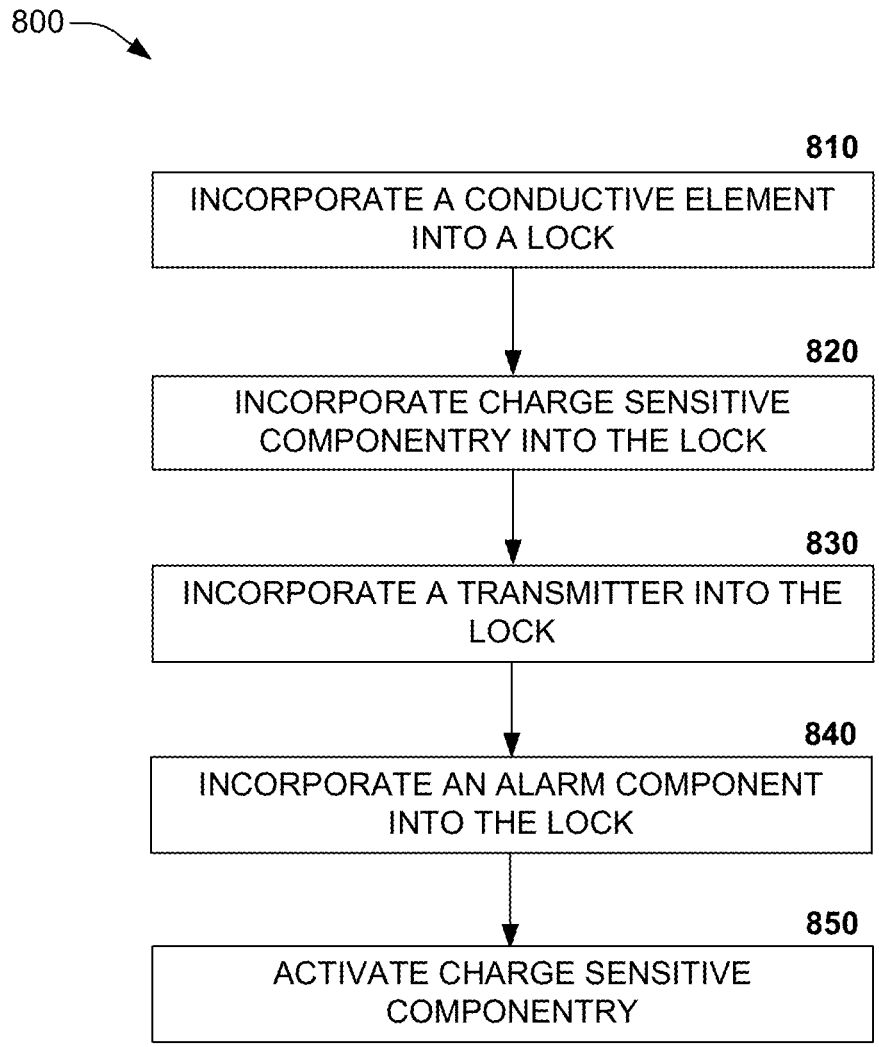
FIG. 8 is a flow diagram illustrating an exemplary methodology for fabricating and activating a lock, according to an embodiment.

FIG. 8 illustrates an exemplary methodology 800 for incorporating a tamper detecting system into a lock. At 810 a conductive element can be incorporated into a lock. For example, where the lock comprises a U-lock configuration the conductive element can be incorporated into, or placed on the surface of, the U-lock bar. Alternatively, where the lock is a cable lock, the conductive element can be incorporated into the cable weave. In another alternative embodiment, the conductive element can be located along a link of chains for a chain lock. As previously mentioned, the conductive element can be isolated from a surrounding structure, e.g., as an insulated wire in a cable weave.

At 820, a sensing component can be incorporated into the lock portion of the lock (e.g., the U-lock, the cable lock, the chain lock, etc.). The sensing component can be configured to determine a change in electrical charge on the conductive element when the lock is being tampered with.

At 830, a transmitter component can be incorporated into the lock. The transmitter component can be configured to transmit an alarm notification in the event of the lock is being tampered with, moved, etc.

At 840, an alarm component can be incorporated into the lock. The alarm component can be a light, audible alarm, or similar device. Further, the alarm component can also operate in conjunction with a transceiver component, whereby, when tampering of the lock is determined a signal can be transmitted from the transceiver component to a remotely coupled device such as a mobile phone, a remote network, etc.

At 850, the lock can be activated (e.g., the lock is locked), whereby a charge can be applied to the conductive element forming a circuit which can be monitored by the sensing component.

Figure 9:
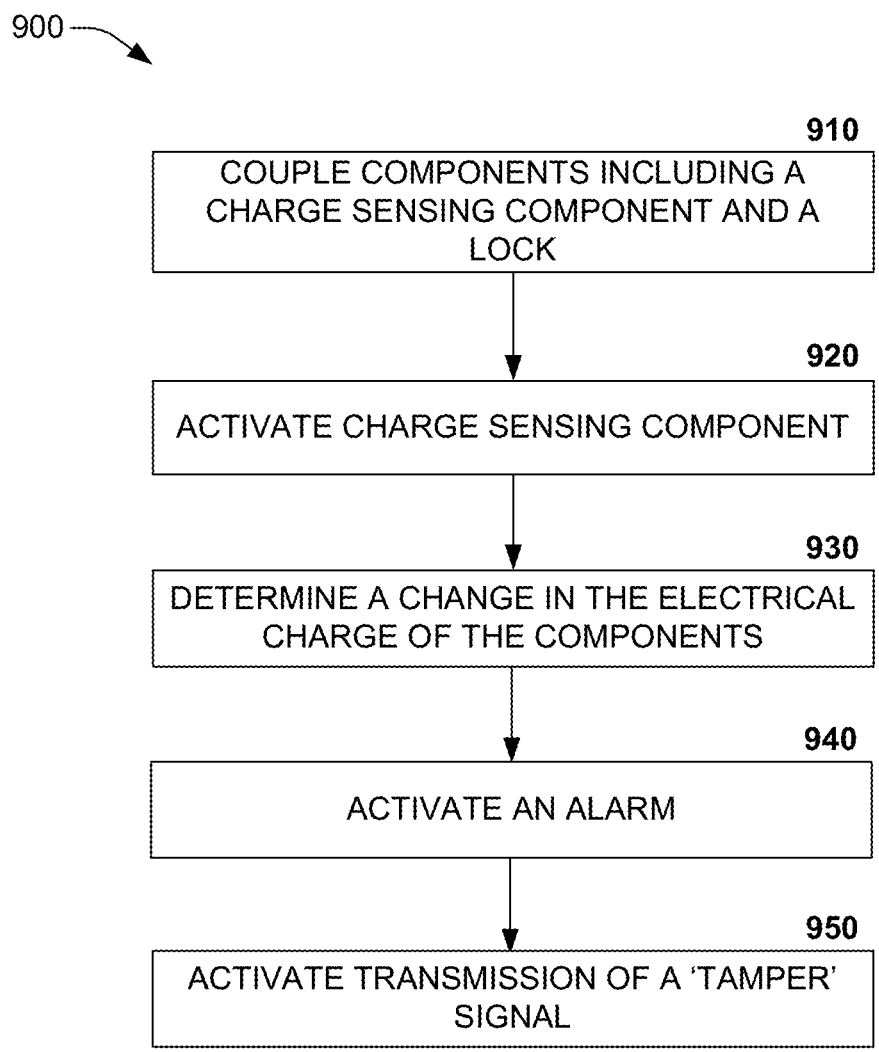
FIG. 9 is a flow diagram illustrating an exemplary methodology for determining a change in electrical charge applied to a lock, according to an embodiment.

FIG. 9 illustrates an exemplary methodology 900 for detecting a lock being tampered with. At 910, various components comprising a lock can be electrically coupled. For example, a conductive wire in a cable portion of a lock can be electrically coupled to a charge sensing component located in the lock portion of the lock, whereby an electrical charge can be provided by a battery located in the lock portion of the lock.

At 920, the charge sensing component can be activated, whereby the charge on the conductive element (whether provided by a battery or from the charge sensing component) can be measured and identified as a 'base level' charge.

At 930, a change in the charge on the conductive element can be sensed, for example as a result of the conductive element being cut or damaged as the lock is tampered with (e.g., as part of an attempt to steal the bicycle). The change in the electrical charge can be based upon a measured charge being different to the 'base level' charge. In an embodiment, the measured change can be based on change relative to the 'base level' where the change can be a factory set value. In another embodiment, the change can be configured by an operator (e.g., the bicycle owner), e.g., via a user interface component operating on a mobile device, personal computer, or the like, communicatively coupled to the charge sensing component.

At 940, based upon a determined change in the electrical charge by the charge sensing component, the charge sensing component can activate an alarm. For example, a light on the bike lock can be activated (e.g., flashes), an audible alarm can be transmitted by a speaker or other sound producing component located on the lock.

At 950, based upon a determined change in the electrical charge by the charge sensing component, a transceiver can transmit a signal to a remote device (e.g., a mobile phone) indicating that there has been a change in the electrical charge across the lock and that the lock is being moved and/or tampered with. As previously described, a lock can also include a motion sensing component which can be utilized to detect movement of the lock based upon an electrical circuit being closed and/or opened, the detected movement can be identified and acted upon by the charge sensing component and/or transceiver.

Figure 10:
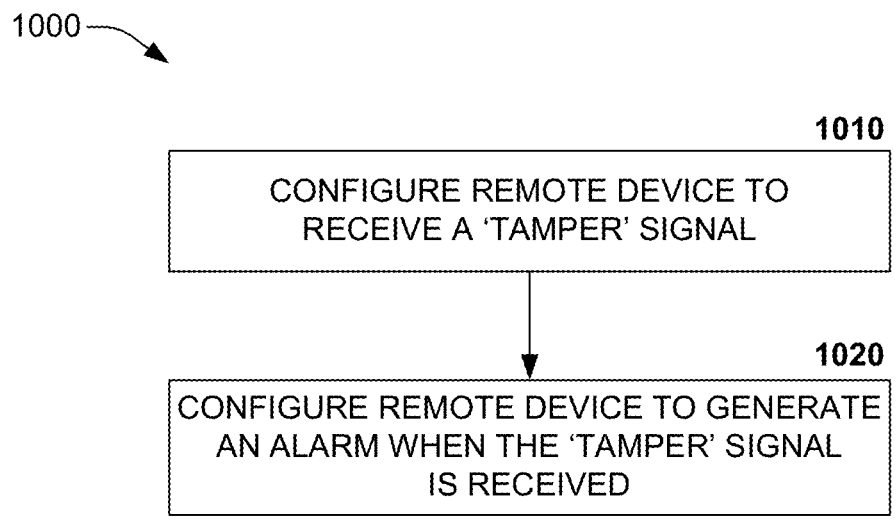
FIG. 10 is a flow diagram illustrating an exemplary methodology for a device to generate an alarm, according to an embodiment.

FIG. 10 illustrates an exemplary methodology 1000 for configuring a device to present a 'tamper' signal. At 1010, a remotely operated device (e.g., a mobile phone, a remote server, a personal computer, etc.) can be configured to receive a 'tamper' signal. As part of the configuration, the device can be communicatively coupled with the lock such that the device can receive a transmission from the lock, i.e., the device has knowledge of an identifier associated with the lock, whereby the identifier can be transmitted with a 'tamper' signal from the lock. Hence, if a plurality of locks are being monitored by the device, it is possible to discern which lock is generating the tamper signal.

At 1020, the remote device can be configured, e.g., via the interface, to generate an alarm (e.g., a text message, initiate vibration of the device, generate an audible alarm, activation of a light, etc.) upon receipt of a 'tamper' signal being received from the lock.

Figure 11:
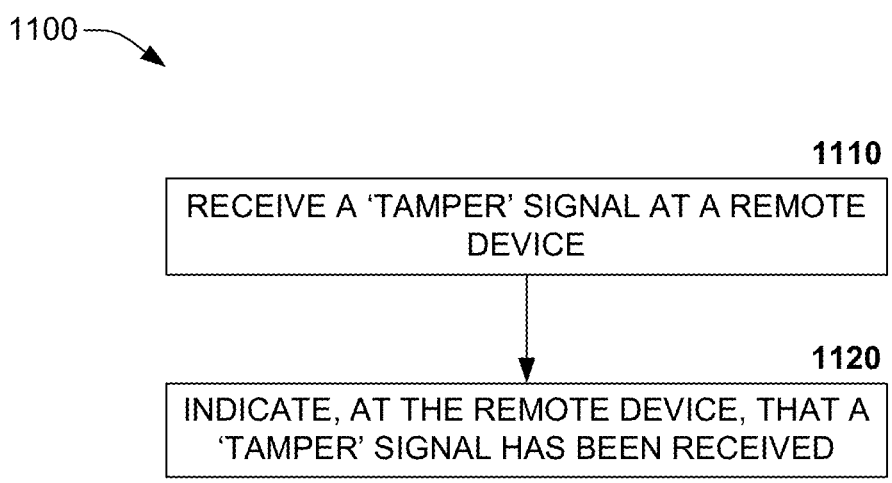
FIG. 11 is a flow diagram illustrating an exemplary methodology for a device to receive notification of an alarm, according to an embodiment.

FIG. 11 illustrates an exemplary methodology 1100 for generating a 'tamper' signal on a device remote from a bicycle lock. At 1110, a 'tamper' signal can be received from a lock (e.g., from a transmission component associated with a charge sensing component located at the lock).

At 1120, based upon receipt of the 'tamper' signal, the device (e.g., a mobile phone, a remote server, a personal computer, etc.) can generate a notification indicating receipt of the 'tamper' signal at the device. As previously mentioned, the notification can be any of a text message, mechanical activation (e.g., vibration) of the device, generation of an audible alarm, activation of a light, etc.). The signal can also be forwarded to a central monitoring system. Based upon receipt of the signal and source identifier, a database at the central monitoring system can be accessed and the owner of the bicycle can be informed that a 'tamper' signal has been received.

Figure 12:
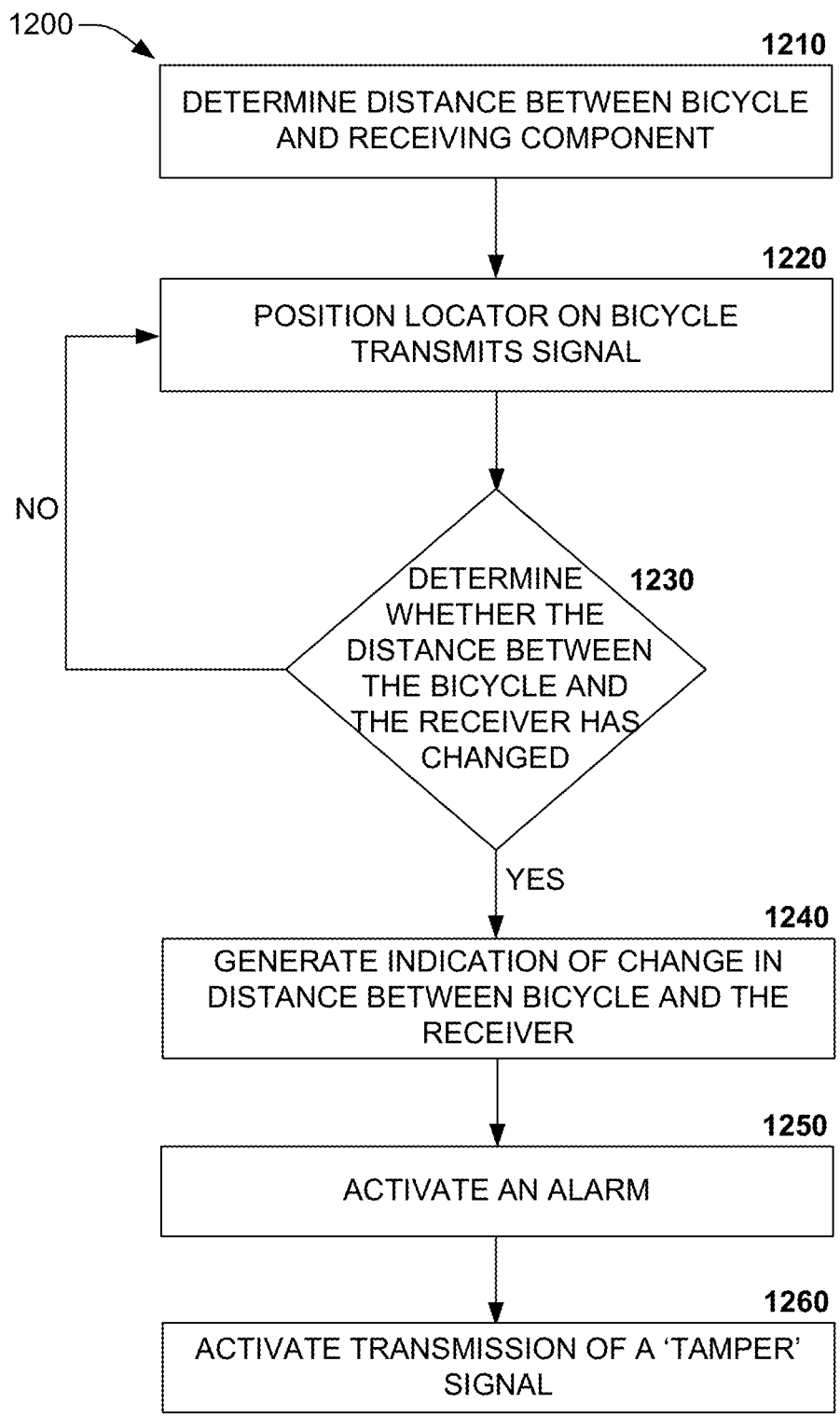
FIG. 12 is a flow diagram illustrating an exemplary methodology for determining a change in location of a bicycle, according to an embodiment.

FIG. 12 illustrates an exemplary methodology 1200 for generating a 'tamper' signal based upon a change in distance between a bicycle and a receiver component. At 1210, a distance between a bicycle and a receiving component can be established. For example, as a function of a bicycle being located for storage on a bike rack, the bicycle is brought into proximity of the bike rack. The bicycle and the bike rack can both include respective sensors (e.g., proximity transceivers) which can be communicatively coupled based, at least in part, on the bicycle being located on or near the bike rack. In an alternative embodiment, the receiving component can be located on a remote device (e.g., a mobile phone) which is being operated by the operator (e.g., the cycle owner) of the bicycle. During initialization the distance between the cyclist and the bicycle can be determined, whereby a transmitter on the bicycle can indicate position to the remote device.

At 1220, a signal can be transmitted from the sensor on the bicycle indicating a position of the bicycle.

At 1230, a determination can be performed regarding whether the distance between the device and the bicycle has changed. For example, has the bike been moved from the bicycle rack? Has the distance between the bicycle and the location of the cyclist changed? In the event of the distance being determined to be unchanged, the flow can return to 1220 whereupon a subsequent positioning signal can be transmitted.

At 1240, in response to a determination of the distance changing, an indication of a change in the distance between the bicycle and the receiver can be generated. In an embodiment, an application can be running on a remote server (e.g., at a system monitoring location of a plurality of bicycles) and can generate an indication that the bicycle has been moved. In an alternative embodiment, a notification can be provided on the mobile device being operated by the cyclist thereby indicating that the bicycle has been moved.

At 1250, an alarm can be generated. In an embodiment, the alarm can be operated local to the bike rack, e.g., the alarm is activated on a household security system which is operating in conjunction with the sensor on the bike rack. In another embodiment, the alarm can be operating on a mobile device, as previously described.

At 1260, in an embodiment, the tamper signal can be forwarded to a remote system. For example, the remote system can serve a bicycling community spread over a region, such as citywide, statewide, nationwide, etc. Upon receiving indication of the bicycle is no longer in a defined distance a signal can be sent to a device operated by the cyclist.

As mentioned, advantageously, the techniques described herein can be applied to any system supporting the control operations described herein. It can be understood, therefore, that handheld, portable and other computing devices and computing objects of all kinds are contemplated for use in connection with the various embodiments, e.g., detecting a lock being tampered with and according alarm generation. Accordingly, the below general purpose remote computer described below in FIG. 13 is but one example of a computing device, where the computing device can comprise any of an alarm component 190, a tremble detection component 320, a sensing component 580, a transmission component 590, etc., a mobile device 530 and associated components, a network 540 and associated components, an external device, etc., as presented above.

Figure 13:
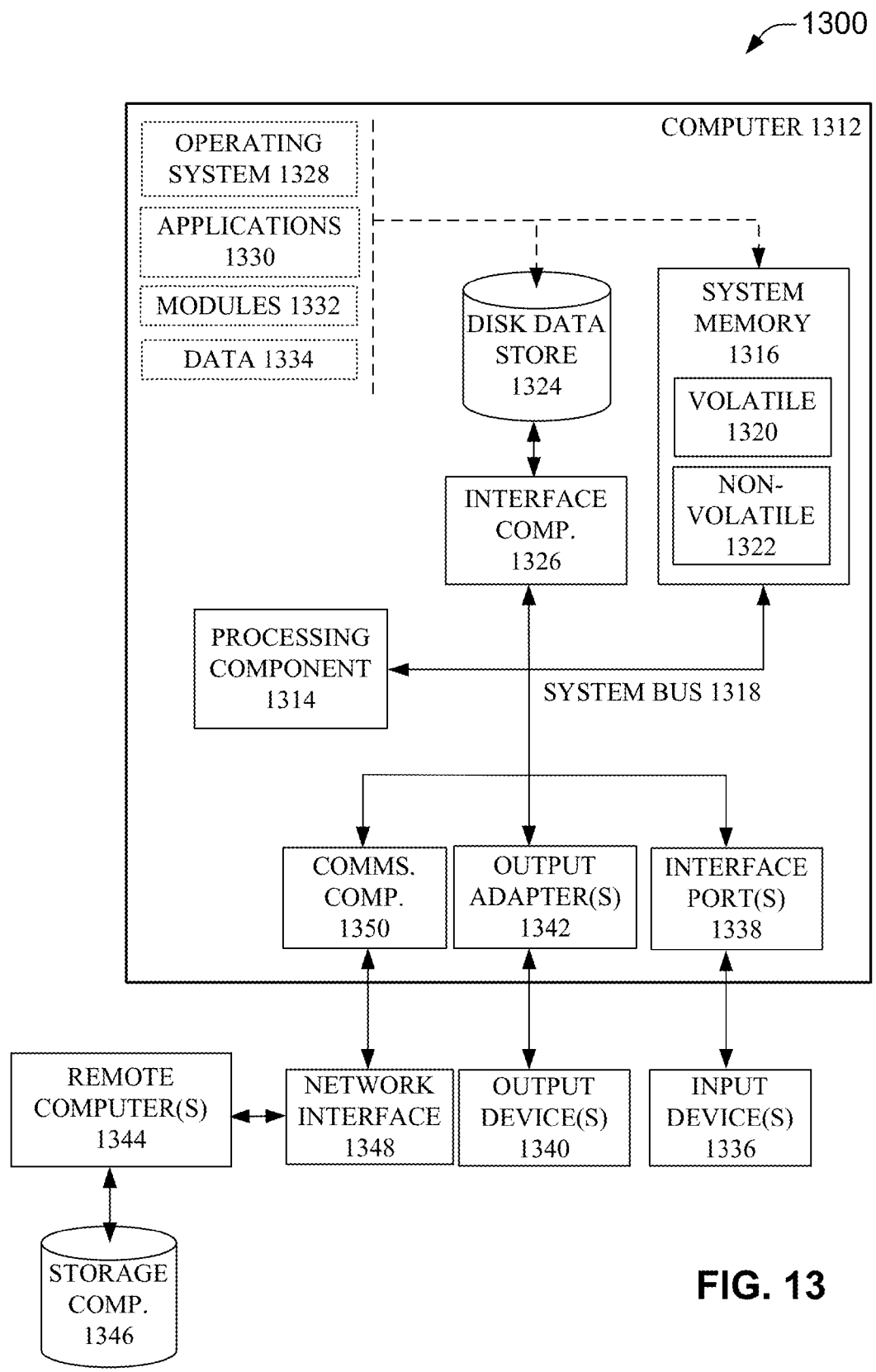
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be incorporated into any of a lock (e.g., lock 100), a remote device such as a mobile phone 530, a remote network 540 and/or 550, etc., to facilitate determination of any of a lock being damaged, cut, or tampered with, an alarm being generated, an alarm notification being sent and/or received, a component being moved, etc. For example, computing device 1300 can operate as an alarm component 190, a tremble detection component 320, a sensing component 580, a transmission component 590, etc.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the exemplary computing system environment 1300.

With reference to FIG. 13, an example environment 1300 for implementing various aspects of the aforementioned subject matter, including determining a lock is being tampered with, broken, moved, etc., includes a computer 1312. The computer 1312 can include any of a processing component 1314, a system memory 1316, and a system bus 1318. System bus 1318 is employed to couple system components comprising environment 1300, including, but not limited to, the system memory 1316 to the processing component 1314. The processing component 1314 can be any of various available processors, including dual microprocessors and other multi-processor architectures.

System memory 1316 can include volatile memory 1320 and non-volatile memory 1322. In exemplary, non-limiting embodiments, non-volatile memory 822 can comprise any of read only memory (ROM), programmable ROM (PROM), electrically programmable ROM (EPROM), electrically erasable PROM (EEPROM), or flash memory. In an exemplary, non-limiting embodiment, volatile memory 1320 includes random access memory (RAM), which acts as external cache memory, wherein, a non-exhaustive listing, RAM can comprise of synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The basic input/output system (BIOS), containing the basic routines to transfer information between elements within the computer 1312, such as during start-up, is stored in non-volatile memory 1322.

System bus 1318 can be any of several types of bus structure(s) including the memory bus or memory controller, a peripheral bus or external bus, and/or a local bus using any variety of available bus architectures and, in a non-exhaustive listing can include any of 8-bit bus, VESA Local Bus (VLB), Universal Serial Bus (USB), Extended ISA (EISA), Industrial Standard Architecture (ISA), Micro-Channel Architecture (MSA), Advanced Graphics Port (AGP), Intelligent Drive Electronics (IDE), Peripheral Component Interconnect (PCI), Small Computer Systems Interface (SCSI), and Personal Computer Memory Card International Association bus (PCMCIA).

Computer 1312 can also comprise removable/non-removable, volatile/non-volatile computer storage media, such as, for example, a disk data store 1324. Disk data store 1324 can include, in a non-exhaustive listing, any of a magnetic disk drive, floppy disk drive, tape drive, Jaz drive, Zip drive, LS-100 drive, flash memory card, memory stick, or other device providing comparable functionality. Further, disk data store 1324 can also comprise storage media separately or in combination with other storage media including, in a non-exhaustive listing, an optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface, e.g., interface 1326, can be employed to facilitate connection of any of one or more disk data store(s) 1324 to the system bus 1318.

FIG. 13 further presents software which can act as an intermediary between an operator(s) of components comprising environment 1300 and the various components comprising computer system environment 1312. In a non-exhaustive listing, software can comprise any of an operating system 1328, system applications 1330, program modules 1332, and program data 1334 (e.g., data employed to determine a distance between a lock and a mobile phone, a degree of change in voltage from V1 to V2, data to facilitate identification of an owner of a device which is locked). Operating system 1328, which can be stored on disk storage 1324, facilitates control and allocation of resources of the computer system 1312. System applications 1330 operate in accord with the management of system resources by operating system 1328 through program modules 1332 and program data 1334 stored either in system memory 1316 or on disk storage 1324. It is to be appreciated that the subject invention can be implemented with a variety of, or combination of, operating systems.

Input device(s) 1336, can be employed by an entity to facilitate entry of commands or information into the computer 1312. In a non-exhaustive listing, input devices 1336 can comprise a pointing device such as a mouse, trackball, stylus, touch pad, keyboard, microphone, joystick, game pad, satellite dish, scanner, TV tuner card, digital camera, digital video camera, web camera, and the like. Further, in an exemplary, non-limiting embodiment, input device 1336 can be located on a lock, or operated remotely such as a mobile phone or other external device. These and other input devices connect to the processing component 1314 through the system bus 1318 via interface port(s) 1338. In a non-exhaustive listing, interface port(s) 1338 can comprise any of a serial port, a parallel port, a game port, and a universal serial bus (USB). It is to be appreciated that output device(s) 1340 can utilize some of the same type of ports as input device(s) 1336. In an exemplary, non-limiting embodiment, a USB port may be used to provide input to computer 1312, and to output information from computer 1312 to an output device 1340. An output adapter 1342 can be utilized to facilitate communication with particular output devices 1340 like monitors, speakers, and printers, among other output devices 1340, which require special adapters. In a non-exhaustive listing, output adapters 1342 can include video and sound cards provisioning a means of connection between the output device 1340 and the system bus 1318. It is to be appreciated that other devices and/or systems of devices also provide both input and output capabilities such as remote computer(s) 1344. In a non-exhaustive listing, remote computer(s) 1344 can be a personal computer, a server, a router, a network PC, a workstation, a microprocessor based appliance, a peer device or other common network node and the like, and can include, some or all of the components (both hardware and software) comprising computer 1312. Information can be transmitted to remote computer(s) 1344, where such information can comprise of alarm data, timing data, distance data, owner data, electrical charge value(s), etc., wherein the information can be stored in memory storage component 1346. Further, remote computer(s) 1344 can also provide any information to facilitate operation of the various embodiments presented herein, wherein any necessary data, e.g., a voltage level, a distance, etc., can be retrieved, or received, from memory storage component 1346.

Computer 1312 can operate in a networked environment utilizing logical connections to one or more remote computers, such as remote computer(s) 1344. Remote computer(s) 1344 can be logically connected to computer 1312 through a network interface 1348 and further can be physically connected via communication component/connection 1350. Network interface 1348 encompasses communication networks such as local-area networks (LAN) and wide-area networks (WAN). In a non-exhaustive listing, LAN technologies include Fiber Distributed Data Interface (FDDI), Copper Distributed Data Interface (CDDI), Ethernet/IEEE 802.3, Token Ring/IEEE 802.5 and the like. In a non-exhaustive listing, WAN technologies include point-to-point links, circuit switching networks like Integrated Services Digital Networks (ISDN) and variations thereon, packet switching networks, and Digital Subscriber Lines (DSL).

Connection of the network interface 1348 to the system bus 1318 is facilitated by hardware/software comprising communication connection(s) 1350. It is to be appreciated that while communication connection(s) 1350 is shown located inside computer 1312, communication connection(s) 1350 can also be located externally to computer 1312. In a non-exhaustive listing, hardware/software comprising communication connection(s) can comprise of internal and external technologies such as, modems including regular telephone grade modems, cable modems and DSL modems, ISDN adapters, and Ethernet cards. Where communications can be by any available means, e.g., in a non-exhaustive listing, wired, wireless, Wi-Fi, IEEE 802.11 (a,b,g,n), BLUETOOTH, RS-232 data, Wi-Fi Direct, WIMAX, Super WIFI, WLAN, radio, etc.

One of ordinary skill in the art can appreciate that the various embodiments of systems and methods for controlling a plane in a 3D representation described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in video viewing and tagging mechanisms as described for various embodiments of the subject disclosure.

As mentioned above, while exemplary embodiments have been described in connection with various computing devices and network architectures, the underlying concepts may be applied to any network system and any computing device or system in which it is desirable to implement controlling orientation of a plane within a 3D representation to facilitate generation of image data associated with the plane.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A bicycle lock comprising:
   a detachable securing component, wherein a conductive component is formed along the length of the securing component; and
   a lock portion, wherein a first end of the securing component locates into a first opening in the lock and a second end of the securing component locates in a second opening in the lock, the lock further comprises a charge sensing component located therein, wherein the charge sensing component is configured to:
   form an electrical circuit with the conductive component; and
   sense a change in an electrical charge applied across the electrical circuit.

2. The bicycle lock of claim 1, wherein the charge sensing component is further configured to, in response to sensing a change in the electrical charge, generate an alarm condition.

3. The bicycle lock of claim 2, the lock portion further comprising an alarm component configured to, in response to receiving the alarm condition, activate at least one of an audible alarm component or an optical alarm component.

4. The bicycle lock of claim 2, the lock portion further comprising a transmission component configured to, in response to receiving the alarm condition, transmit an alarm notification to a remote device.

5. The bicycle lock of claim 4, wherein the remote device is at least one of a mobile phone, a remote network, a local network, or a personal computer.

6. The bicycle lock of claim 4, wherein the alarm notification is transmitted in combination with an identifier, the identifier configured to identify the bicycle lock.

7. The bicycle lock of claim 1, wherein the securing component is one of a length of cable, a length of chain, or a length of bar, wherein the bar is formed into a U shape.

8. The bicycle lock of claim 1, the lock portion further comprising a power supply configured to provide the electrical charge.

9. The bicycle lock of claim 1, wherein the change in electrical charge is a function of at least one of the conductive component being cut, the conductive component being damaged, the securing component being removed from the lock, or a power supply associated with the lock being damaged.

10. The bicycle lock of claim 1, further comprising a tremble switch, wherein the tremble switch is located in the lock portion and is configured to detect movement of the bicycle lock and, in response to detection of movement, the tremble switch is further configured to output an indication of the movement to the charge sensing component.

11. The bicycle lock of claim 10, wherein the tremble switch comprises a leaf spring and a ring contact, motion of the bicycle lock causes motion of a first end of the leaf spring causing the leaf spring to contact the ring contact to close an electrical circuit, closure of the electrical circuit is detected by the charge sensing component.

12. A method, comprising:
   dectecting a change in electrical charge across an electrical circuit, wherein the electrical circuit comprises a conductive element located on a securing component and a lock, wherin the change in electrical charge is detected by a charge sensing component located in the lock; and
   generating an alarm based at least in part upon detecting the change in the electrical charge, wherin the alarm is generated by an alarm componet located in the lock.

13. The method of claim 12, wherein the alarm is at least one of an audible alarm or an optical alarm.

14. The method of claim 12, wherein the alarm is an alarm notification and the generating of the alarm further comprising transmitting the alarm notification to a remote device.

15. The method of claim 12, wherein the change in electrical charge resulting from the conductive element being cut or damaged.

16. The method of claim 12, wherein the change in electrical charge resulting from the securing component being removed from the lock.

17. The method of claim 12, wherein the securing component is one of a length of cable, a length of chain, or a length of bar, wherein the bar is formed into a U shape.

18. A computer-readable storage medium comprising instructions that, when executed by a processor located in a bicycle lock, cause the processor to perform acts comprising:
- detecting a change in electrical charge across an electrical circuit, wherein the electrical circuit comprises a conductive element located on a securing component and a lock, wherein the securing component and the lock form the bicycle lock and the change in electrical charge resulting from the conductive element being cut or damaged; and
- generating an alarm based at least in part upon detecting the change in the electrical charge.

19. The computer-readable storage medium of claim 18, wherein the alarm is at least one of an audible alarm or an optical alarm.

20. The computer-readable storage medium of claim 18, wherein the alarm is an alarm notification and the generating of the alarm further comprising transmitting the alarm notification to a remote device.

\* \* \* \* \*